US010138953B1

(12) United States Patent
Koenig et al.

(10) Patent No.: US 10,138,953 B1
(45) Date of Patent: Nov. 27, 2018

(54) ELECTROSTATIC CLUTCH AND TRANSMISSIONS

(71) Applicant: SRI International, Menlo Park, CA (US)

(72) Inventors: Karen Shakespear Koenig, San Francisco, CA (US); Pablo Eduardo Garcia Kilroy, Menlo Park, CA (US); Brian Keith McCoy, Sunnyvale, CA (US); Allegra Anna Lenta Shum, San Francisco, CA (US); Joseph Stephen Eckerle, Woodside, CA (US)

(73) Assignee: SRI International, Menlo Park, CA (US)

( * ) Notice: Subject to any disclaimer, the term of this patent is extended or adjusted under 35 U.S.C. 154(b) by 184 days.

(21) Appl. No.: 15/219,263

(22) Filed: Jul. 25, 2016

Related U.S. Application Data

(60) Provisional application No. 62/196,182, filed on Jul. 23, 2015.

(51) Int. Cl.

| | |
|---|---|
| ***F16D 27/02*** | (2006.01) |
| ***F16D 13/64*** | (2006.01) |
| ***F16H 3/66*** | (2006.01) |

(52) U.S. Cl.
CPC ............. *F16D 27/02* (2013.01); *F16D 13/64* (2013.01); *F16H 3/666* (2013.01); *F16H 2200/0034* (2013.01); *F16H 2200/2007* (2013.01); *F16H 2200/2035* (2013.01)

(58) Field of Classification Search
None
See application file for complete search history.

(56) References Cited

U.S. PATENT DOCUMENTS

| | | | | |
|---|---|---|---|---|
| 6,564,916 | B1 * | 5/2003 | Suzuki | B60T 13/748 192/113.35 |
| 9,702,438 | B2 * | 7/2017 | Boulet | F16H 3/66 |
| 2011/0132713 | A1 * | 6/2011 | Biegger | F16D 27/115 192/66.1 |
| 2013/0010398 | A1 | 1/2013 | Prahlad et al. | |
| 2013/0276826 | A1 | 10/2013 | Koenig et al. | |
| 2015/0158382 | A1 * | 6/2015 | Mordukhovich | F16H 3/663 475/318 |
| 2017/0122413 | A1 * | 5/2017 | Tsao | B60K 1/00 |

* cited by examiner

*Primary Examiner* — Jacob S. Scott
(74) *Attorney, Agent, or Firm* — McDonnell Boehnen Hulbert & Berghoff LLP

(57) ABSTRACT

Methods and apparatus related to electrolaminate clutches and transmissions are disclosed. A device can include: an input shaft that can be coupled to an electrolaminate sheet; an output shaft that can be coupled rigidly to a spring positioned over the input shaft, where the spring includes a tab that fits a groove of a spring capture ring that can be positioned over the input shaft; and a drum connected to an electrical ground between the electrolaminate sheet and the spring capture ring, where the drum can be coupled rigidly to the spring capture ring. Then, when a voltage is applied to the electrolaminate sheet, the electrolaminate sheet can clamp to the drum and impart rotation of the input shaft to the drum. The imparted rotation can cause the spring capture ring and the spring to rotate and clamp down on the input shaft, imparting rotation to the output shaft.

18 Claims, 18 Drawing Sheets

Clutch off

Clutch on

ELECTROSTATIC CLUTCH AND TRANSMISSIONS

CROSS-REFERENCE TO RELATED APPLICATIONS

This application claims priority to U.S. Patent Application No. 62/196,182, filed Jul. 23, 2016, the contents of which are fully incorporated by reference herein for all purposes.

GOVERNMENT LICENSE RIGHTS

This invention was made in part with Government support under contract number W91CRB-10-C-0139 awarded by the U.S. Army. The Government has certain rights in this invention.

BACKGROUND

Unless otherwise indicated herein, the materials described in this section are not prior art to the claims in this application and are not admitted to be prior art by inclusion in this section.

Robots are currently being used in numerous applications and in numerous ways. A few examples of their utilization may be found in industrial applications where robots are used to perform repetitious or strenuous tasks and in medical applications sometimes to assist a surgeon to perform surgery. For all their proliferation, robots are still limited in various ways. One limitation which characterizes many robots is that they can only operate for a certain amount of time with a given battery size. One cause of this limitation is due to the losses that occur in the process of converting electrical energy to mechanical outputs. Improving the efficiency of conversion would then directly lead to longer operation time given a battery size. In addition, the concepts to improve efficiency in mobile robots may be advantageous on stationary wall-powered robots as well. For example, improved efficiency may lead to smaller motors thus leading to more compact design. Yet another limitation that also characterizes many robots is that they are often designed for the worst case load and speed conditions, making them big and bulky. This is because a robot designer generally picks a set transmission ratio for each actuator. Currently available variable transmissions, such as the nuVinci or belt-driven conical continuously variable transmissions used in larger vehicles, are generally less efficient and much heavier and bulkier than single-speed options available to robot designers. Theoretically, smaller motors or actuators could be used if variable transmissions were comparable in efficiency, size, and weight. Designing a robot that can quickly adapt to changing load conditions and operate with high efficiency would be desirable.

SUMMARY

Some embodiments of the present disclosure provide a method. The method includes coupling an input stage to an output stage utilizing two surfaces. At least one of the surfaces is flexible and thin. The two surfaces are electrostatically clamped together when a voltage is applied across the two surfaces. When the two surfaces are clamped, an input rotation is imparted to rotate the output stage. When the voltage is not applied, the input rotation is not imparted to the output stage.

Some embodiments of the present disclosure provide a two speed transmission system. The two speed transmission system includes a first and second electrolaminate disc clutch, where the first disc clutch is associated with one or more gear stages, and where the second clutch is associated with an output stage.

Some embodiments of the present disclosure provide a device. The device includes comprising: an input shaft coupled to an electrolaminate sheet, an output shaft coupled rigidly to a spring positioned over the input shaft, the spring having a tab that fits in a groove within a spring capture ring, the spring capture ring positioned over the input shaft, a drum connected to an electrical ground positioned between the electrolaminate sheet and the spring capture ring, where the drum is coupled rigidly to the spring capture ring. The electrolaminate sheet, when a voltage is applied to the electrolaminate sheet, clamps to the drum and imparts rotation of the input shaft to the drum causing the spring capture ring to rotate, which subsequently causes the spring to rotate and clamp down on the input shaft to impart rotation to the output shaft.

These as well as other aspects, advantages, and alternatives, will become apparent to those of ordinary skill in the art by reading the following detailed description, with reference where appropriate to the accompanying drawings.

DETAILED DESCRIPTION

Figure 1A:
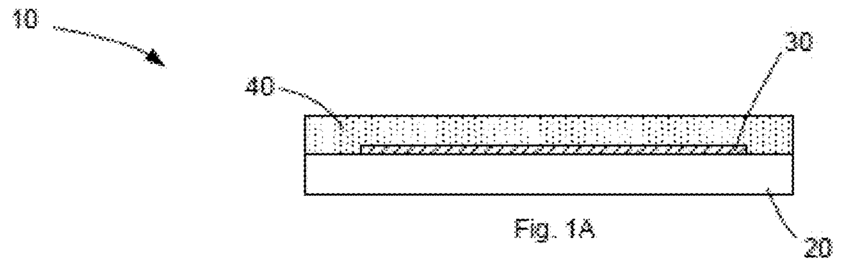
FIG. 1A illustrates one surface of an electrolaminate clutch.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Some embodiments of the present disclosure provide efficient, light-weight, compact and fast switching multi-speed or variable transmissions which can be applied in robotic manipulators. Multispeed or variable transmissions have been developed for a variety of applications but have not been widely used in robotics due to their complexity, volume and weight.

In some robots, since the speeds and torques of robotic manipulators are highly cyclical and variable, using fixed gear ratio transmissions results in high energy inefficiencies because the motor is operating away from its optimum efficiency mode. It also limits the range of forces and speeds at which the manipulator can operate, forcing the designer to oversize the motors in order to meet worst case conditions. With a fixed gear ratio, conventional gear boxes do not allow dynamic matching of the load impedance, leading to larger, heavier, less-efficient actuators. Just as a fixed-gear bicycle does not provide efficient locomotion in hilly terrain, a fixed-gear-ratio transmission actuator limits the capabilities of a robotic joint and wastes energy.

Minimizing the time it takes to change gear ratios also leads to advantages since constraints on the speed with which gear ratio may change limits the speed at which the manipulator may change loads and as a result the range or tasks which it may accomplish. For example, for a walking robot the leg needs to move fast and with no load during the swing phase, but slower and with a higher load during the stance phase of the walk. Similarly, in a pick and place robot, the manipulator may need to switch between carrying a heavy load at low speed and no load at high speed, thus minimizing the cycle time.

Other advantages may be realized by being able to switch gear ratios under load and at zero speed to avoid limiting the range of tasks the robotic manipulator can perform.

Several innovative transmission techniques and mechanisms are described herein. Common to the concepts described in this disclosure is the use of the electrolaminate effect. The electrolaminate effect, based on previously described electrolaminate technology, enables the clamping of two surfaces when a voltage is applied across the surfaces. This effect is used in various ways in the concepts within this disclosure.

Based on the electrolaminate effect, an electrolaminate disc clutch is described. An electrolaminate disc clutch may be lightweight and compact, thus lending itself to address the needs described above. Compared to existing means of engaging clutches, such as solenoids, the electrolaminate clutch is lightweight, low-volume, and low power. In some other concepts, various other types of clutches other than a disc clutch are described. These include the wrap spring clutch and a band clutch.

In yet other concepts, multi-speed gear box transmission systems are described using the electrolaminate clutch technology. Briefly, in these systems, multiple electrolaminate clutches may be used to obtain a high-speed, low torque operation or low speed high torque operation. Combining the electrolaminate engagement system with a wrap-spring component allows the clutch to be scaled to larger torques than the electrolaminate component could support independently.

Several benefits may be realized with the innovative clutches and transmission systems described in this disclosure. The small footprint of the electrolaminate clutch allows designing a very compact single speed or multispeed transmission with a low number of parts. The clutch can be easily integrated with a planetary gearhead design without adding much volume or weight to it. Typical on-market multispeed gear boxes are expensive and bulky. Due to their bulk and expense, the on-market gear boxes may not be suitable for integration with a robotic system, especially one that is intended to be mobile. The electrolaminate clutches provide a mechanism by which gearing may be achieved with thin and light weight components. Yet another benefit is that the light-weight clutch allows rapid engagement at a millisecond rate enabling a rapid actuation of the clutch. Since the electrostatic clutch engages with a flat surface (instead of a toothed surface, for example), it can engage disengage under load and at any speed.

An additional benefit is that the electromagnetic clutch is capacitive in nature, and therefore uses very little power when engaged. When compared to electromagnetic clutches, the electrostatic clutch uses up to three orders of magnitude less power, making it ideal for power efficient applications.

The competition can be characterized by the various clutches that are available in the market now. However, none have the characteristic that the concepts described in this disclosure has in terms of low weight and bulk and being capable of being made with inexpensive parts and manufacturing techniques.

II. Electrolaminate Clutches and Transmissions—Operating Principles

Figure 1B:
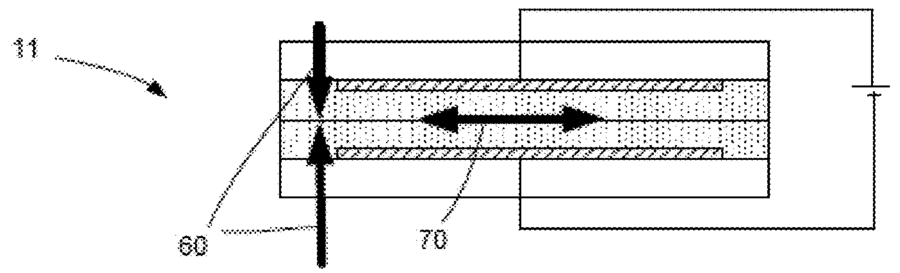
FIG. 1B shows a configuration of a clutch using two flexible surfaces.
Figure 1C:
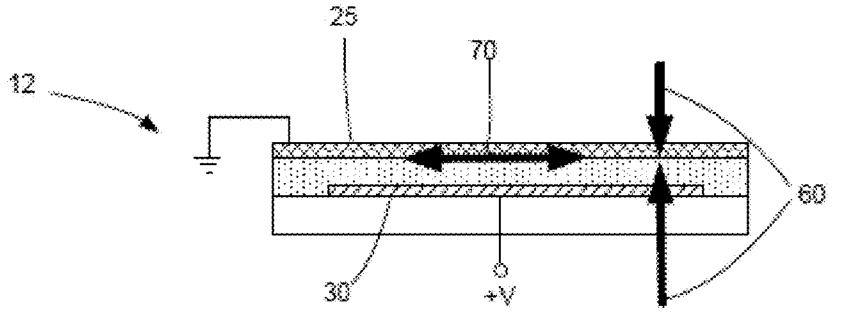
FIG. 1C shows a configuration of a clutch using one flexible surface and one metal surface.

FIGS. 1A-C illustrate the operating principle of an electrolaminate clutch. The operating principle is based on the fact that oppositely charged surfaces will experience a force of attraction towards each other; thus if one surface rotates it will cause a second surface coupled electrostatically to the first surface to also rotate, given that a voltage is applied across the surfaces. A clutch can thus be formed by controlling the application of the voltage. If no voltage is applied, the second surface will not be electrostatically coupled to the first surface and the rotation will not be transferred from one surface to another. The operating principle is described in detail in "Materials for Electroadhesion and Electrolaminate, US 20130010398A1" assigned to the Stanford Research Institute.

FIG. 1A shows one surface 10 of an electrolaminate clutch. This surface is typically flexible. The substrate of this surface is shown as 20 and may consist of materials such as but not limited to polyimide, Kapton®, or Mylar®. A conductive layer 30 (or the electrode) is coupled on top of the substrate material. The conductive layer may be composed of metals including but not limited to copper or silver. These electrodes may be patterned or non-patterned on top of the substrate. A further layer 40 of dielectric material is coupled to the electrode. The dielectric material may be composed of materials such as but not limited to polyurethane.

FIG. 1B shows a configuration 11 where a pair of flexible surfaces as described above with respect to FIG. 1A is placed so that the dielectric layers of each surface face each other. FIG. 1B also shows an electric circuit coupled to the conductive layers such that a capacitor is formed with the two surfaces. The electrostatic force between the two surfaces is depicted by arrows 60. This force is also called the clamping force in this disclosure. A second force that acts along the surface, the shear force, is also shown by arrow 70.

FIG. 1C shows another configuration 12 where the flexible surface is placed against a metal surface 25. The metal surface may be rigid or flexible. In FIG. 1C, the metal surface is electrically grounded with a positive voltage being applied to the conductive layer 30. The same types of forces as described with respect to FIG. 1B exist with this configuration as well.

Although specific configurations of applied voltages are shown in FIGS. 1B and 1C, it is only necessary that a voltage potential exist between the conductive layers of FIG. 1B or between the conductive layer and the metal layer in FIG. 1C. As an example, a voltage of +500V may be applied to one side and a voltage of −500V may be applied to the other side. Other values of voltages are possible.

The flexible surfaces of the electrolaminate clutch such as 10 in FIG. 1A may be as thin as 0.09" or less. Other thickness values are not excluded. The thinness allows these surfaces to flex and conform to the shapes of the opposing surface. This allows the surfaces to be in close proximity to each other which ensures that the electrostatic clamping force is very high. Consequently the torque transfer from one surface to another is also high, making this an advantageous configuration for a clutch.

In FIGS. 1B and 1C, the clamping force is shown by arrows 60. If the two surfaces were to be pulled away (or sheared) from each other (to the left and right in FIGS. 1B and 1C), the friction between the surfaces will counteract the pull force. The shear force indicated by arrow 70 comes into effect in this situation. The shear force can be expressed by:

$$T_s = \mu T_c \quad \text{Eqn. 1}$$

where $T_s$ is the shear force, μ is the coefficient of static friction and $T_c$ is the clamping force.

The coefficient of friction and the clamping force can both be varied independently by using different types of materials, thickness of materials and magnitude of voltage that is applied across the dielectric. This implies that the shear force can be varied by varying the coefficient of friction and the clamping force. This leads to the use of an electrolaminate device in various applications. One broad category is the use of devices based on the principle described above for clutches which may then lead to design of light weight, low cost, efficient transmissions.

III. Electrolaminate Disc Clutch

Figure 2A:
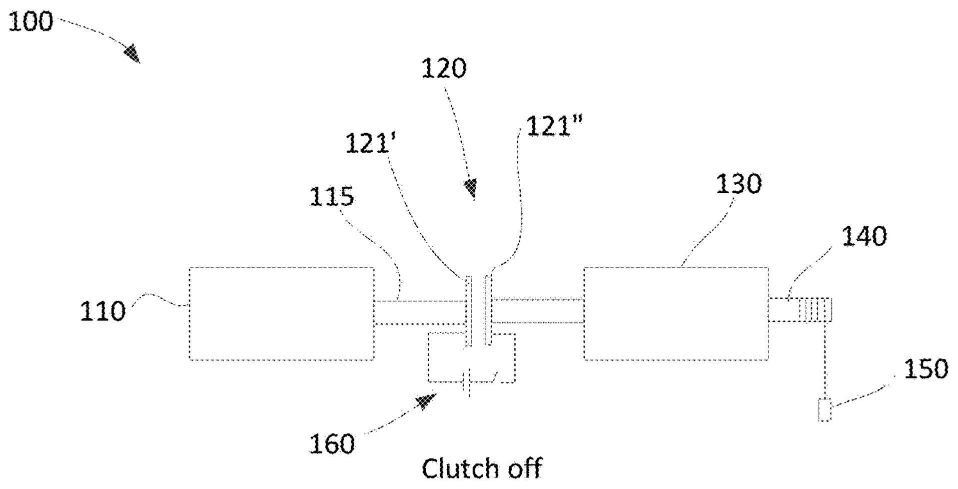
FIGS. 2A-B illustrate an electrolaminate disc clutch.

FIGS. 2A and B describe the concept of the use of the electrolaminate effect to form a clutch. FIG. 2A shows a motor 110 driving an axle 115 which terminates with one surface of an electrolaminate clutch 121'. The second surface 121" is shown separated by a distance. The second surface 121" is also shown coupled to a gearbox 130 which is further coupled to a load 150 through an axle 140. An electrical circuit 160 is shown coupled to the surfaces 121' and 121" with the switch in the off position. In this configuration, the motor 110 is not coupled to the gearbox 130 so even if the motor is turned on and rotates, no work is done in terms of lifting the load 150.

Figure 2B:
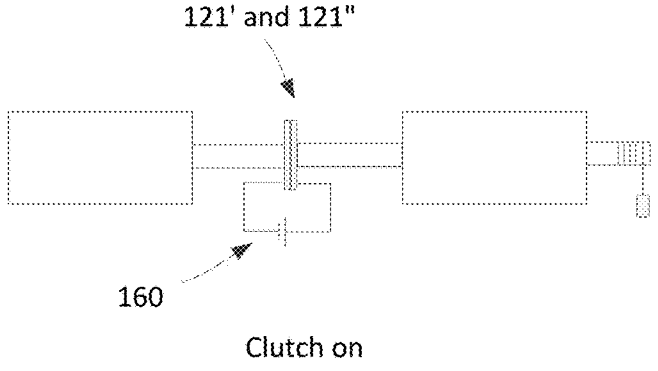

In FIG. 2B, the switch in electrical circuit 160 is turned on and a voltage is applied to the surfaces 121' and 121". Due to the electrostatic effect, the surfaces are now attracted to each other as explained in FIG. 1. As long as an appropriate voltage is applied and the surfaces are made of materials to provide sufficient appropriate clamping and shear force, the output of the motor is coupled to the gearbox which then lifts the load 150.

In one variation of the electrolaminate clutch, surfaces 121' and 121" are thin and lightweight and conformable. For example, the surfaces may be as thin as 0.09". In another variation, the surfaces may be layered and interleaved to increase the overall torque transmitted by the clutch. The interleaved configuration of the surfaces is illustrated in FIG. 2K and is described briefly later in this document. The entire weight of the clutch (including the two surfaces) may be less than 20 g. In comparison, on-market electromagnetic clutches of similar toque capabilities are typically hundreds of grams.

Figure 2C:
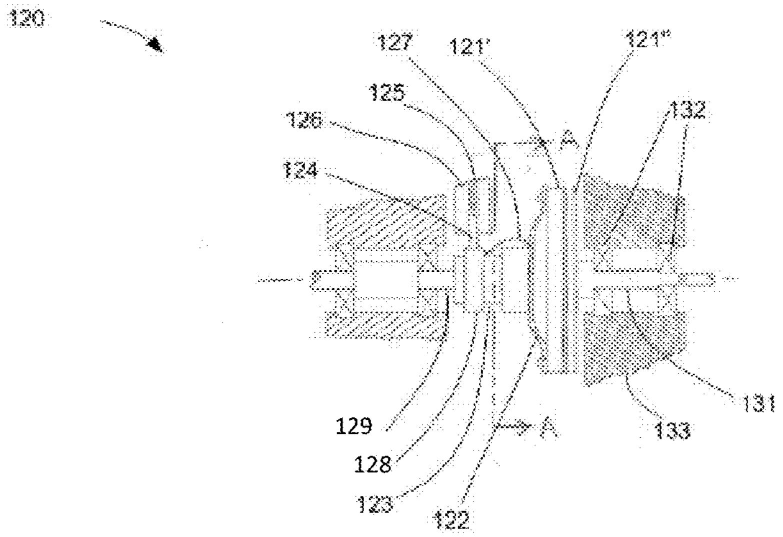
FIG. 2C illustrates a detailed implementation of the electrolaminate disc clutch.
Figure 2D:
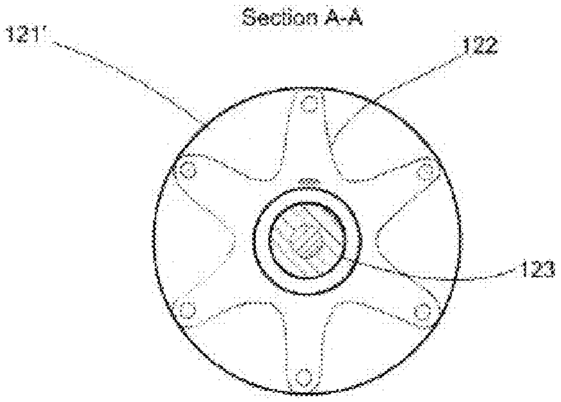
FIG. 2D illustrates the cross-sectional view along section AA shown in FIG. 2B.

FIGS. 2C and 2D illustrate more details about the electrolaminate clutch. Just as in FIGS. 2A and 2B, the two surfaces of the clutch in FIG. 2C are shown as 121' and 121". In FIGS. 2C and 2D, the disk 121' is illustrated as the drive disk and disk 121" is illustrated as the driven disk. A spider spring 122, shown in FIG. 2D, couples the drive disk 121' to an input hub 123. The input hub may be coupled to an input motor by a shaft 129. The input hub 123 may be made of insulating material. A slip ring 128 may be mounted on the input hub 123. The slip ring may be in contact with a brush 124 which may be pressed against the slip ring by a spring 125. Spring 125 may be held in a brush holder 126. An electrical conductor 127 may connect the slip ring to the spider spring 122. The objective of the brush holder 126, the brush 124, the slip ring 128, the electrical conductor 127 and the spider spring 122 is to provide an electric circuit to the drive disk 121'. The electric circuit itself is not shown in FIG. 2C. On the side of the driven disk 121", shaft 131 and bearings 132 provide support for disk 121" to rotate. Bearings 132 couple the shaft 131 to housing 133. The shaft 131, the bearings 132 and the housing 133 may all be electrically conductive such that the disk 121" may be electrically grounded. When drive disk 121' is energized, electrostatic attraction causes the drive disk 121' to move towards 121". The spider spring 122 allows the disk 121' to move towards 121". These same electrostatic forces, acting through friction, cause the driven disk 121" to rotate when drive disk 121' rotates. When disk 121' is de-energized, there are no attractive forces between the disks and the spider spring causes the disk 121' to move back, away from the disk 121" and the disk 121" may no longer rotate. Hence in some configurations, a constant speed motor may cause the drive disk 121' to keep rotating but by energizing and de-energizing the electrical circuit in a specific sequence, the driven disk 121" may be caused to rotate at any speed within the allowed range of 0 to maximum speed of the input motor. The energizing and de-energizing sequences are described in more detail in the companion disclosure titled "Mechanically Switching Infinitely Variable Transmission".

Figure 2E:
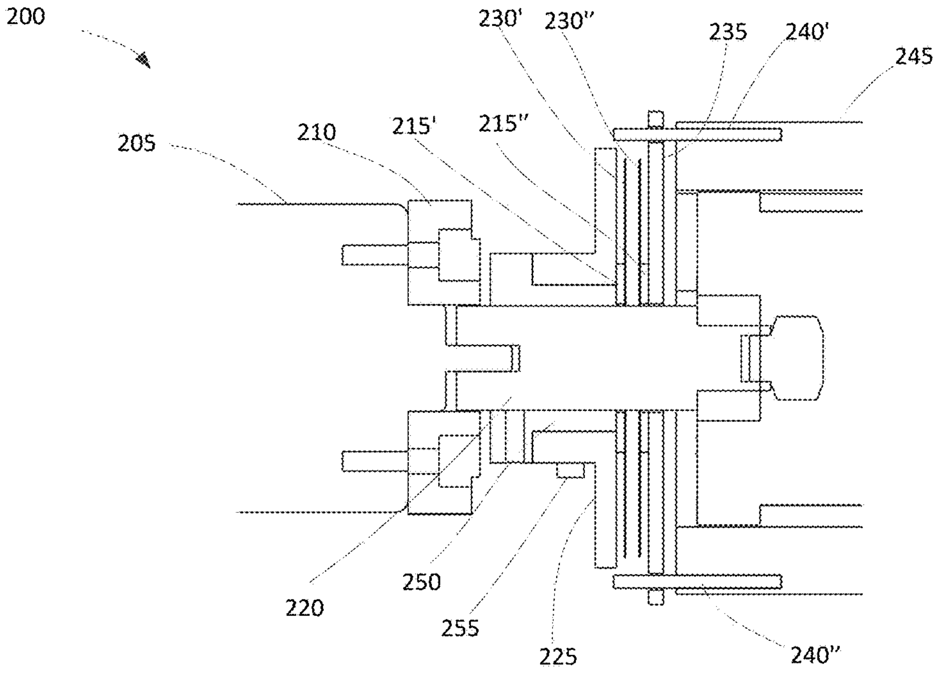
FIGS. 2E, 2F, and 2G illustrate three other configurations of the disc clutch design.

Yet other configurations of the electrolaminate disc clutch are now described. As specified earlier, one or both of the surfaces of the electrolaminate clutch may be made of a thin flexible material. Challenges encountered when one or both surfaces of a clutch are flexible include how to make the clutch flexible enough to conform rapidly to the opposing surface and still rigid enough to transmit enough torque. The configurations below address the challenge. FIG. 2E shows a cross section of the device using the electrolaminate clutch. 205 is a motor held in place by a housing 210. The main shaft of the device is denoted by 220. To the right of FIG. 2E, 245 is generally a multispeed gearbox. The multispeed gearbox will be explained in detail below but for the purposes of this part of the discussion related to how to hold and configure the electrolaminate clutch, it is sufficient to assume 245 represents an output stage. Thus the output stage 245 is coupled to a thin but rigid plate 235 via four pins of which only two are shown as the figure is a cross sectional view. The two visible pins are denoted by 240' and 240". The pins are only loosely coupled to the disc 235. They fit inside holes which are slightly oversized; for example if the pins are 0.063" diameter, the holes may be 0.080" diameter. There may be more or less holes and pins, for example 3 or 6 holes. The disc 235 may be made of plastic and may be as thin as 1/16" thick. Other thicknesses and materials are not excluded. This disc has the same number of holes around the edge to accommodate the pins. In this example, due to the assumption that the device 200 has four pins, the disc 235 will have four holes as well. This disc also has a large hole in the center to accommodate the shaft 220. Additionally, the disc also has a second smaller disc 215", arranged concentrically about its axis as shown in the figure. The second disc 215" and the larger disc 235 may be made of one piece or it may be two pieces bonded together. Additionally, the second disc (215") is bonded to one of surfaces 230" of the electrolaminate clutch. This surface (230") is a very thin, flexible material, for example 0.09" thick. It may be made of a thin polymer substrate such as Kapton® with a layer of conductive electrode material such as copper and a layer of dielectric polymer encasing the electrode. The second surface 230' of the electrolaminate clutch is similarly bonded to a second small disc 215'. This second small disc 215' is coupled to a metal mount 225 which is coupled to bushing 250 made of insulator material. The bushing insulates the metal mount 225 from the metal axle 220. However, the bushing and therefore the metal mount, the disc 215' and the surface 230' are coupled such that they are always spinning with the motor and at the speed of the motor. The metal mount 225 may be connected to an electrical circuit via a bush, or a roller, depicted by 255. Surfaces 230' and 230" of the electrolaminate clutch are also discs and their diameter is larger than the diameter of disc 215' and 215" but smaller that the pin to pin distance between 240' and 240".

For the electrolaminate clutch to work, torque has to be transmitted from one surface to another. In this case, torque needs to be transmitted from surface 230' to 230" in order to transmit torque from the input (motor) to the output (output of the gearbox). The surfaces need to be in very close proximity to each other to begin with for example less than 0.5 mm apart, for the electrostatic attraction between the surfaces to overcome other forces and couple the surfaces together. Any misalignment of either of the two surfaces in any direction will reduce total area of the surfaces that can touch each other, reducing the electrostatic coupling and thus reducing the amount of torque that can be transmitted before the clutch slips. An example of the misalignment is if the second surface 230" is skewed along the axis of the shaft such that in relation to how the figure is drawn, the surface 230" may not be vertical. Another example of misalignment is if the second surface is slightly rotated around an axis perpendicular to the axis of the motor. Alignment issues may occur with the surface 230' as well. Further, alignment issues may be caused by imperfections in the shape of the surfaces themselves. The reason why misalignment causes a decrease in the maximum torque that is possible to transfer is due to the fact that the electrostatic forces are strong when the surfaces are in contact with each other but are quite weak when there is any appreciable distance between the surfaces or sections of the surfaces. Thus the structures that hold the surfaces have to be such that they allow the two surfaces of the electrolaminate clutch to conform to each other's shape, thus overcoming misalignments. Specifically, referring back to the figure, the reason the surfaces 230' and 230" can self-align themselves with very little extra force is because surface 235 is only coupled loosely to the pins 240', 240", 240'" (not shown) and 240"" (not shown). By being loosely coupled (in other word by not restricting the motion of the surface 235 within a certain range), the pins and support disk 235 allow the two planes of the clutch 215' and 215" to be parallel even if there is some skew between the faces of disk 225 and the gearbox 245. When a voltage is applied across the surfaces 230' and 230" (the two surfaces of the electrolaminate clutch), since they are in close proximity to begin with and flexible, the surfaces 230' and 230" will conform to each other's shape, which may be a more complex shape than a simple plane. In addition to the loose coupling of the plate 235 with the pins, the plates 215' and 215" play an advantageous role in the alignment of the surfaces 230' and 230". The advantage is realized due to the diameter of the plates 215' and 215" being smaller that the diameter of the surfaces 230' and 230" of the electrolaminate clutch. To understand why, it is easier to think about the consequences of mounting the flexible surfaces of the electrolaminate clutch on a rigid base with the same diameter as the plates. When mounted on a rigid base, the ability of the flexible surfaces to conform to each other's shape is diminished or removed altogether. If there are any imperfections in shape, the surfaces or at least sections of the surfaces will not be in close proximity to each other and the ability to transmit torque may be diminished. These effects are explained in more detail in US2013/0276826 by some of the same authors of this disclosure.

The design of the clutch for example the choice of the diameters of the plates 215' and 215" relative to the diameter of the electrolaminate surfaces, the stiffness of the electrolaminate surfaces must be such that the maximum torque is transmitted with the least possible weight and bulk of the clutch. The design must be such that the clutch overcomes the various failure modes. One failure mode is associated with buckling of the electrolaminate surfaces. As explained above, the electrolaminate disks will adhere to each other over more surface area if the plates supporting them (215' and 215") are small in surface area. As the plates 215' and 215" are rigid, the electrolaminate surfaces effectively do not adhere to each other over the surface where the back side of the electrolaminate surface is adhered to the rigid support plate 215' or 215" because they cannot conform to each other. This argues for small support plates in order to maximize the area of electrolaminate clamping and thus maximize the torque that can be transmitted. However, because the electrolaminate surfaces are thin and flexible, they will buckle or wrinkle if too much torque is applied. The onset of buckling is dependent on the stiffness of the electrolaminate surfaces, their materials, and the diameters of the electrolaminate surfaces and the support plates 215' and 215". If buckling occurs, it may limit the maximum torque capacity of the clutch, rather than the other failure modes which will be discussed next. The parameters that affect buckling mentioned above must be so chosen that buckling does not occur given the application the clutch is being used for. The application will determine among other factors, the anticipated load, the speed at which the motors have to rotate, the size the clutch and indeed the entire drive mechanism ought to be.

Yet another failure mode is associated with the surfaces of the electromagnetic clutch 230' and 230" slipping relative to each other. Slippage may occur when the electrolaminate clamping force is the limiting factor. However to prevent slippage from occurring, the total maximum theoretical torque transmission of the electrolaminate clutch (assuming no buckling) may be evaluated. The equations for this maximum torque are given below. FIG. 2I shows a small patch at a distance r from the center of the electrolaminate surface. The maximum torque that can be transmitted by a small patch is given by the shear force Fs×r (the distance between the central axis and the patch). This suggests that patches further from the central axis of the device have the ability to transmit more torque (for a given maximum electrolaminate clamping force) than patches close to the central axis. FIG. 2J describes the procedure for calculating the theoretical maximum torque that may be transmitted by a surface with an annulus of electrolaminate surface as shown in the configuration in FIG. 2E.

Here:

$F_S$ is the shear force acting on a small patch,

μ is the coefficient of static friction, $F_N$ is the normal force the patch experiences, $P_N$ is the normal pressure the patch experiences, r is the radial distance of the patch from the central axis, $R_1$ is the radius of the disk 215' or 215" (or the inner radius of the annulus of electrolaminate surface), $R_2$ is the outer radius of the electrolaminate surface, dr is the infinitesimal width in the radial direction of a ring, n is the number of interfaces that make up the clutch (FIG. 2E shows 1 interface; however, there may be multiple electrolaminate clutch interfaces, each with one side coupled to the input shaft and one side coupled to the output), and T is the total theoretical maximum torque transmitted by the electrolaminate clutch.

Hence since $$F=PA \quad \text{Eqn. 2}$$

The shear force acting on a ring at a distance r from the center is:

$$F_S=\mu F_N=\mu P_N 2\pi r dr \quad \text{Eqn. 3}$$

The theoretical maximum torque that a ring or disk clutch may transmit is ($R_2$ and $R_1$ define the limits of the available area for torque transmission):

$$T = \mu F_S r = \int_{R_1}^{R_2} \mu P_N n 2\pi r^2 dr \quad \text{Eqn. 4}$$

Thus carrying out the integral, the theoretical maximum torque transmitted by the electrolaminate clutch is $$T = \mu P_N n 2\pi\left(\frac{R_2^3 - R_1^3}{3}\right) \quad \text{Eqn. 5}$$

Thus it can be seen by Eqn. 5 that to maximize T, R2 has to be maximized and R1 needs to be minimized. Moreover, Eqn. 5 shows that for a given amount of clutch surface area, the torque capacity of the clutch can be maximized by situating this given surface area at a large radius (far from the central axis of the device). Eqn. 5 may also be used to limit the torque (by choosing the radii appropriately) that may be transferred in order to prevent failure modes. Finally, Eqn. 5 also suggests that the advantageous configuration of the electrolaminate surface and the stiff backing plate is such that that the stiff backing plate is placed concentrically near the axis of rotation rather than having a stiff backing plate towards the outer edge of the electrolaminate surface.

These three design considerations (maximize electrolaminate clamping area, minimize buckling, and maximize clamping at large radii) lead to the design of the disk clutches as described above with spacer plates 215' and 215". Typical dimensions that satisfy these design considerations are as follows. The spacer plate 215' and 215" are about 0.8" diameter, the electrolaminate surfaces 230' and 230" are about 2" diameter, and the thickness of the electrolaminate surfaces is about 0.009".

Figure 2F:
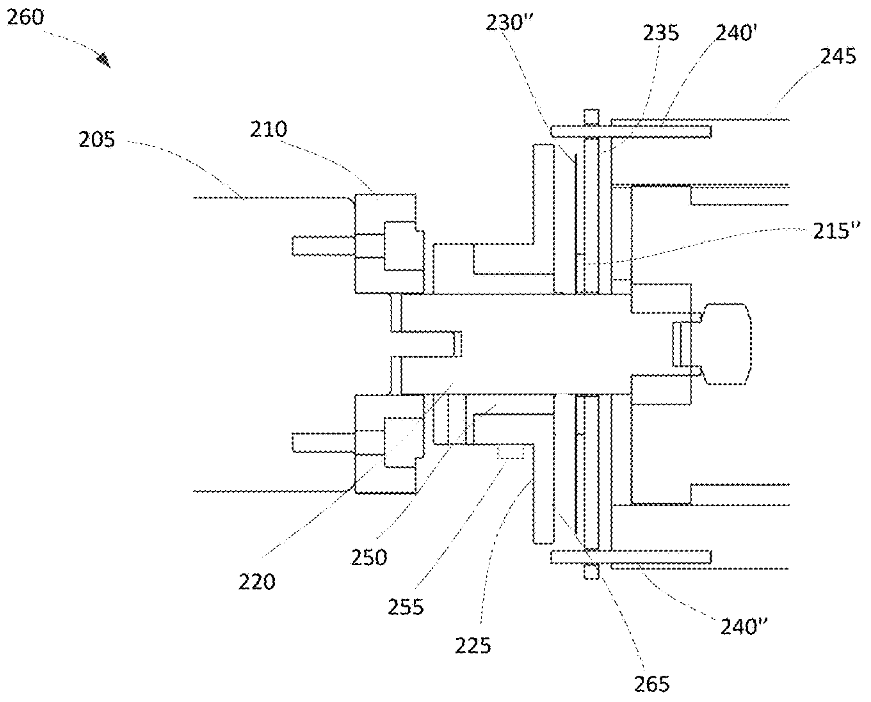

An alternate configuration to device 200 of FIG. 2E is shown is FIG. 2F. Here the only difference is that the surface 230' and disc 215' are removed. Instead the surface 265 of the metal mount 225 acts as an electric ground. Thus in this configuration, instead of having two flexible surfaces, there is one flexible surface (with dielectric material coated or deposited on it) and one rigid surface; however when voltage is applied across the flexible surface and the grounded surface, since the flexible surface can conform to the shape of the rigid surface, efficient torque transfer is obtained.

Figure 2G:
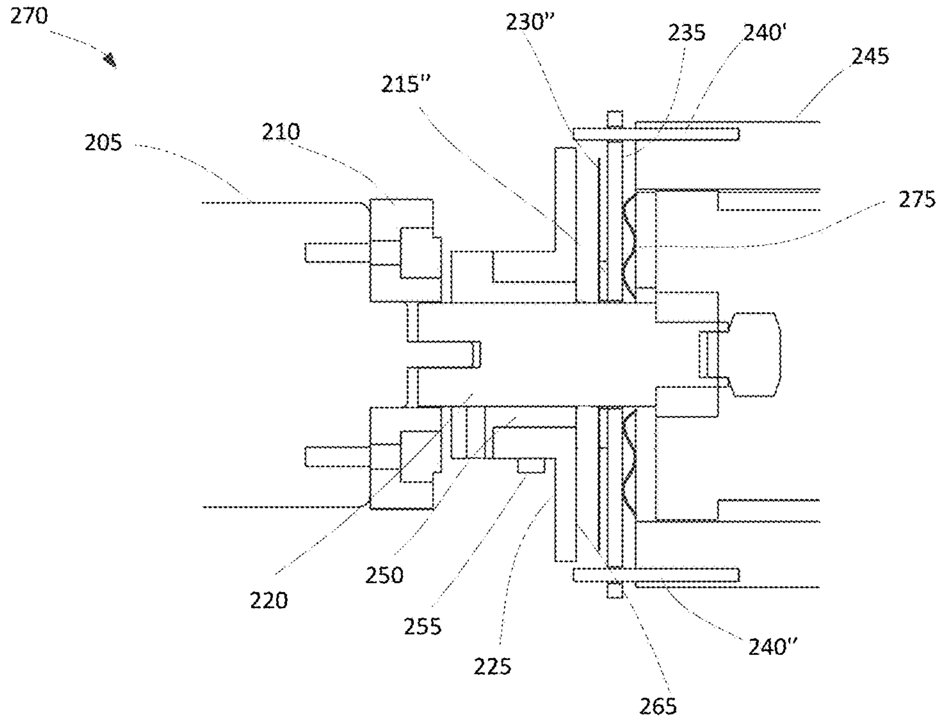

An alternate configuration to device 260 of FIG. 2F is shown in FIG. 2G Here a light weight wave spring 275 is included behind the plate 235 so that the surface 230" of the electrolaminate clutch may always be in loose contact with the electrically grounded surface 265. This configuration will increase the friction between the grounded surface and the surface 230" when the voltage is off but this increase is small and in the order of the friction generally encountered between brushes and rotating components such as axles in motors. However, the advantage of including the spring in the configuration 270 is that faster actuation times may be provided since the surface of electrolaminate and the ground are already in close proximity.

Figure 2H:
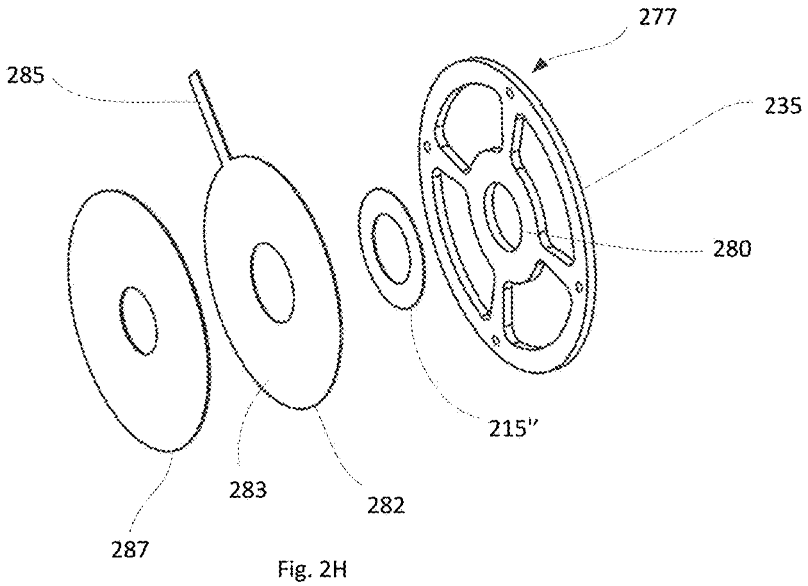
FIG. 2H illustrates a perspective exploded view of the clutch.
Figure 2I:
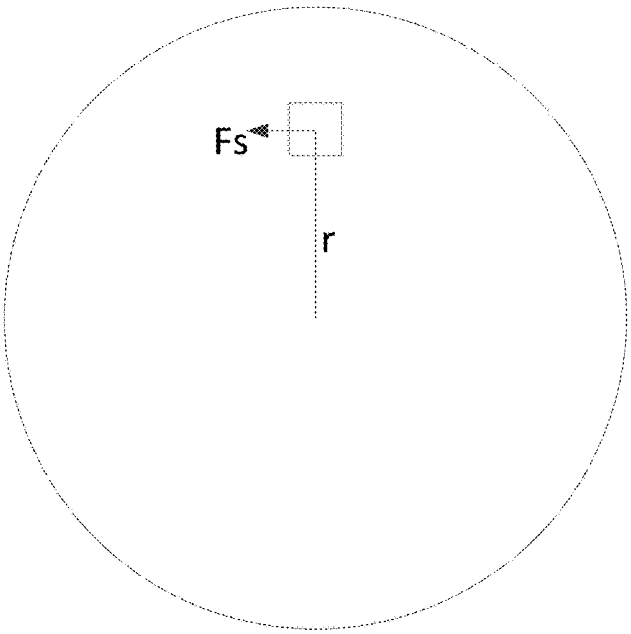
FIGS. 2I and 2J illustrate how to calculate the maximum torque transfer.
Figure 2J:
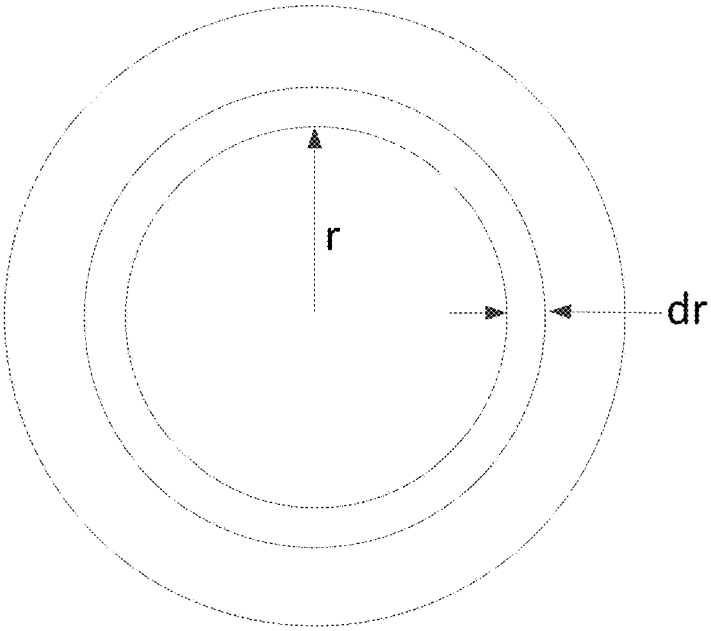
Figure 2K:
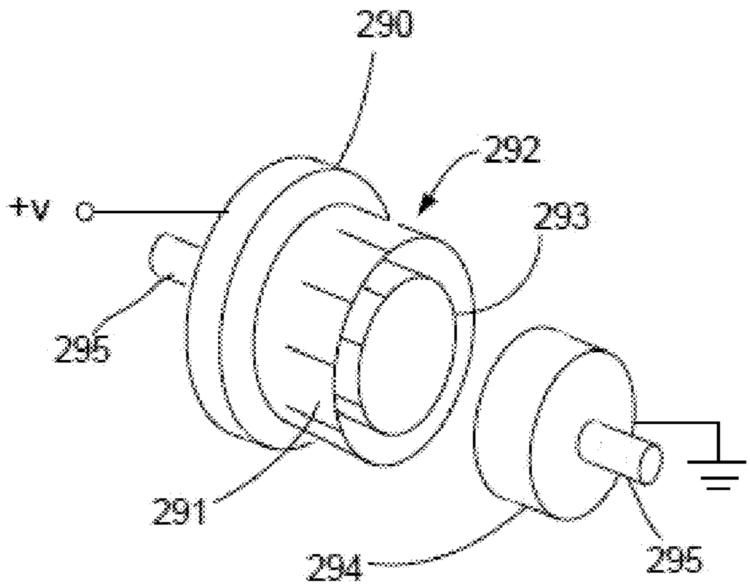
FIG. 2K illustrates a construction of clutch surfaces.

FIG. 2H is an exploded view of the actual clutch assembly. 235 is the lightweight rigid disc as explained above. It is shown to have four holes; only one hole is enumerated as 277 but all four holes are visible. These are the holes the pins 240', 240", 240'" and 240"" go through. 280 is the large hole that the shaft 220 goes through. 215" is the small disc that separates the plate 235 from the electrolaminate surface. The disc 215" is mounted concentrically on 235 and is also thin and made of lightweight materials such as plastic. The thickness of this plate may be less than 1/16" although no limitation is intended. Disc 282 is the part of 230" (one of the surfaces of the electrolaminate clutch) and is the backing or substrate and the electrode. It may be made of a sheet of polymer over which the electrode may be printed. The electrode may be printed only on one surface as shown by 283, and may cover some or all of the surface indicated. For example, the electrode may have a thin border of non-printed substrate material around it, to encapsulate the majority of the electrode within the electrolaminate surface 230. Various ways for printing or etching such electrodes on flexible substrates have been developed for electrical flex circuit design and are well-known in the art. The disc 282 also has a tab 285 which is coated with the same conducting material as used for the electrode so that the electrode can be powered. The tab may be bent over the disc 235 and may be coupled to the metallized housing of 245, the output stage. An alternate arrangement instead of having the tab 285 is to drill a via and connect the electrode printed on surface 283 through the via to the backside of disc 282. A wire may then be coupled to the via on the backside of the disc for example by soldering. This wire would then be connected to an electrical circuit just as the tab 285 would be connected. The location of the via may be advantageously placed as close to the center of the disc as possible. The via and the location of the via may cause the disc to experience less stress around the via compared to the stress it may experience due to the tab. This coupling may be as simple as taping the tabs to the metallized housing or some type of conductive paste may be used to bond the tab to the metallized housing. Not shown in the figure, but brushes or slip rings may then be used to provide power to the metallized housing which would then provide power to the electrode. 287 is a dielectric layer that is then applied on top of the electrode. Not included in FIG. 2H is the second surface 230' of configuration 200 in FIG. 2E. However the design of this surface is similar to the design 230" described in FIG. 2H. If tabs are utilized, the tabs of the plates 230' would be folded over and bonded to the mount 225 thus providing connections to an external circuit. If vias are utilized, a wire bonded to the via would be coupled to mount 225 just as the tab may be bonded.

An alternate construction of the clutch surfaces is illustrated in FIG. 2K. Instead of the clutch having flexible almost planar surfaces as described previously it may assume a configuration as shown in FIG. 2K. The configuration generally has two members 290 and 294. Member 290 may have two concentric segmented drums illustrated by 292 and 293. Only one segment (291) is enumerated. The segments of the drum 292 and 293 may be made of thin flexible material of the type described in FIG. 1A. Drum 294 is a hollow structure made of rigid walls. The drum 294 may be made of lightweight materials such as aluminum. The diameter of the drum 292 is such that it fits between the two segmented drums 292 and 293. The members 290 and 294 are coupled to shafts depicted by 295. In the figure, and only as one possible configuration, drum 294 is made of metal and is electrically grounded and 290 and the drums 292 and 293 are coupled to a positive voltage of +V. The dielectric layer on drum 292 may be on the inside diameter and the dielectric layer on drum 293 may be on the outside diameter. With such a configuration, when drum 294 is inserted in between the space between the drums 292 and 293 and when the voltages are applied as specified, the segments of 292 and 293 will be attracted electrostatically to the drum 294, as long as the initial spacing (before application of the voltages) between the drums is very small such as less than 0.5 mm. Now if either 290 or 294 were to be coupled to a motor, upon application of the voltage, torque will be transferred from one member to the other. As more surface area for coupling is provided by this configuration compared to the configurations in the previous examples, the torque transfer will be larger.

Many variations of the configuration shown in FIG. 2K are possible. Member 290 may have more than two segmented drums and subsequently drum 294 may also have multiple inner drums to interleave between the drums of 290. Member 294 may be made flexible and member 290 may be made rigid. Voltages other than +V and ground may be applied. The dielectric may be applied to only one side such as the inner diameter of the drums of 290.

As an alternative to the above structures described in FIGS. 2E-H, to ensure efficient transmission of torque, all the components of the clutch may be manufactured with very tight tolerances through precision machining. However this type of precision machining will be expensive, driving up the cost (and weight as plastics may not be a suitable material for precise machining) of the transmission system. The methods described above allow the transmission of torque using lightweight materials without the need for precision machining.

In another concept, the electrolaminate clutch may be switched off and on at a rapid rate. For example the clutch may be switched on and off at high speeds for example at 50 Hz. The clutch may work at other speeds such as but not limited to 10 Hz, 20 Hz and 25 Hz. Typical on market devices may work at 25 MHz. In another variation, since the mass of the clutch is small, the transient response i.e. the time period when the load is becoming engaged to the motor or when the load disengages from the motor is also small. A comparison of an electrolaminate clutch described in this disclosure against a typical commercially available electromagnetic clutch is illustrated in Table 1 below.

TABLE 1

| Specification | Unit | Example Electrolaminate Clutch | Typical On-Market EM Clutch |
|---|---|---|---|
| Clamping Pressure | MPA/(psi) | 0.35(50) | N/A |
| Coefficient of Friction | — | 0.2 | N/A |
| Shear Pressure | MPA/(psi) | 0.07/(10) | N/A |
| Torque/Weight | Nm/g | 1 | 0.08 |
| Torque/Volume | Nm/cm$^3$ | 0.5 | 0.018 |
| Engagement Time | msec | 1-100 | 20 |
| Release Time | msec | 1-100 | 20 |
| Power | W | 0.004 | 3.4 |
| Voltage | V | 400 | 24 |
| Current | pA | 10 | 142000 |
| Materials | | Kapton ® with patterned copper electrodes | Permanent magnets molded gears, bushings |

The values of the parameters shown in the table above for the Example Electrolaminate Clutch are example values for one configuration of the clutch but other values of parameters are possible. However, it is instructive to compare some parameters which exhibit the advantages of an electrolaminate clutch. For example the torque to weight ratio is 1 for the electrolaminate clutch but is 0.08 for a typical on-market electromagnetic clutch. Another example is that the power consumption for the electrolaminate clutch is 0.12 W whereas the typical EM clutch has a power consumption of about 3 W. FIGS. 2A-D illustrate a transmission system with one electrolaminate disk clutch. Now, a system with two electrolaminate clutches is described in detail in FIGS. 3A-D.

IV. Multispeed Gearbox Using Electrolaminate Disk Clutch

FIGS. 3A-D illustrate a multispeed gearbox using electrolaminate clutches. In one concept, the multispeed planetary gear box transmission can be electronically switched to quickly adapt its gear ratio to changing load requirements. In another concept, the multispeed gearbox described below allows more efficient power management by closely matching the impedance of a motor to the varying load impedance.

Figure 3A:
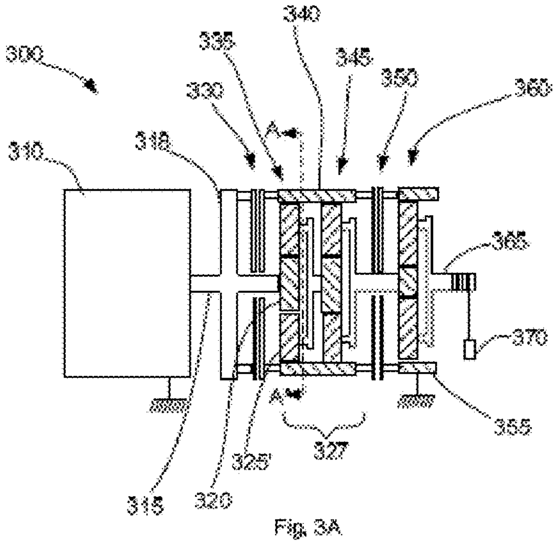
FIGS. 3A, 3B, 3C, and 3D illustrate a two speed gear box using electrolaminate clutches.
Figure 3B:
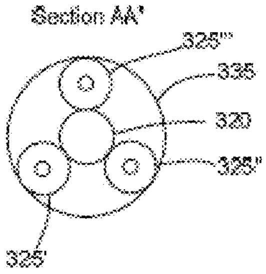

Referring to FIG. 3A, a motor 310 is shown with an axle 315. The axle 315 supports a disc 318 upon which one surface of an electrolaminate clutch 330 is coupled to. The second surface of 330 is coupled to a ring gear 335, which has teeth on the inside diameter. The ring gear is coupled to multiple planetary gears 325', 325" and 325'", each of which is coupled to a sun gear 320. The section AA' of the multispeed gearbox 300 is shown in FIG. 3B where the sun gear 320, the planetary gears 325', 325" and 325'", and the ring gear 335 are all illustrated more clearly. For clarity, no teeth are illustrated in FIG. 3B. The gearbox shown in FIG. 3A has two electrolaminate clutches 330 and 350. It also has three stages of gearing, gearing stage 360, gearing stage 345 and gearing stage 335. Gearing stage 335 and 345 are coupled to the same ring gear 340 so essentially these two gearing stages form one gearbox illustrated as 327 in FIG. 3A. There may be fewer or more gearing stages within gearbox 327. The final gearing stage is illustrated as 360. The final gearing stage also has a ring gear 355 and a set of sun and planetary gears such as illustrated in FIG. 3B. As illustrated in FIG. 3A, the ring gear 355 is always grounded meaning that it is always stationary. The gearing ratios may be different for the output stage compared to the ratios provided by the gearbox 327. Although only one gearing stage 360 is shown, there may be more gearing stages.

Figure 3C:
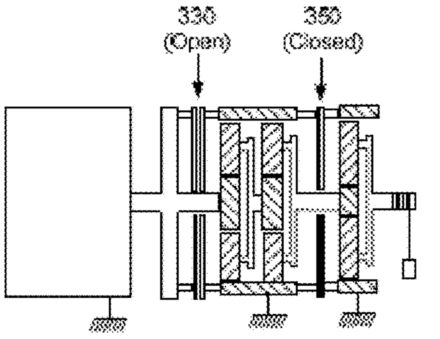
Figure 3D:
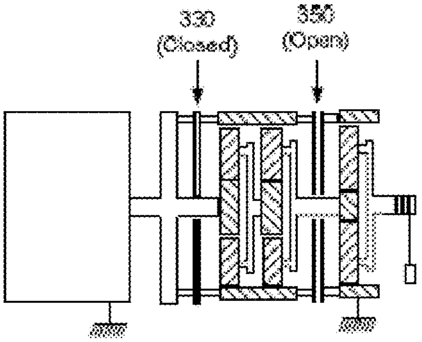

FIGS. 3C and 3D illustrate how the device 300 may work. In FIG. 3C, electrolaminate clutch 350 is closed which is accomplished by applying an appropriate voltage across the surfaces of 350. This action grounds or holds the ring gear 340 stationary. The output of gearbox 327 will then be determined by the gearing stages 335 and 345. This output is further geared by the final output stage 360 and the final gear ratio would be thus be a product of the gear ratio of the final output stage 360 and the gear ratio of the gearbox 327.

In FIG. 3D, electrolaminate clutch 330 is closed and electrolaminate clutch 350 is open. The ring gear 340 now spins with the motor shaft 315. Since the motor shaft 315 is always spinning, the entire gearbox 327 with all its gearing stages spins with the motor shaft and thus providing a gear ratio of 1:1 at the output. The final gear stage 360 is the only gear stage that provides a ratio not equal to 1:1 at its (the final) output.

The utilization of this device is now described. If high speed, low torque operation is required, electrolaminate clutch 330 is turned on and electrolaminate clutch 350 is turned off (FIG. 3D). If low speed, high torque is required, electrolaminate clutch 330 is turned off and electrolaminate clutch 350 is turned on (FIG. 3C). Since the clutches can be turned off on and rapidly, the final output conditions can be accommodated rapidly as they are encountered.

V. Electrolaminate Band Clutch

Figure 4A:
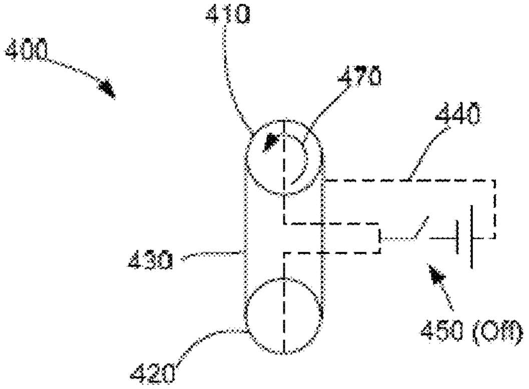
FIGS. 4A, 4B, and 4C illustrate an electrolaminate band clutch
Figure 4B:
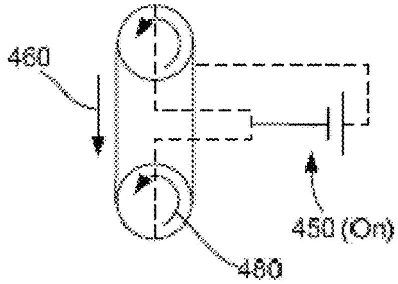
Figure 4C:
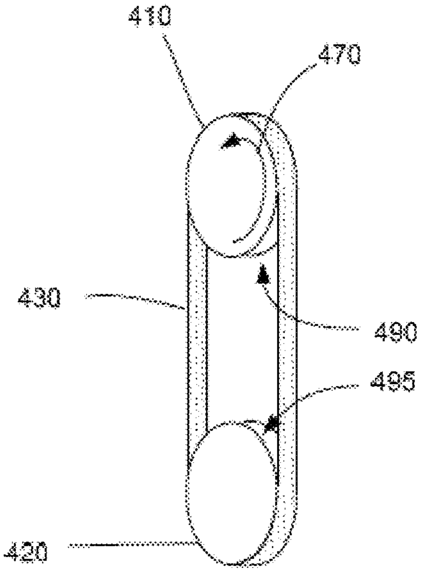

FIGS. 4A-C illustrate yet another concept of a clutch utilizing the electrolaminate effect. In these figures, two wheels 410 and 420 are shown with a band or belt that goes around the two wheels. Wheel 410 is independently actuated for example by a motor and is illustrated spinning in the direction of the arrow 470. Wheel 420 is not independently actuated and depends on the transmission of tension by means of the band or belt 430. In the particular example, the wheels 410 and 420 have flat surfaces over which the belt is placed. In particular, they have no gear teeth. However, both wheels have a coated surface 490 and 495 clearly illustrated in FIG. 4C each of which may form one surface of the electrolaminate clutch individually. The band or belt forms the second surface of the electrolaminate clutch. When the switch 450 in the electrical circuit 440 is off (FIG. 4A), the band or belt couples loosely over the wheels 410 and 420. No tension is transmitted from wheel 410 to wheel 420. When the switch 450 is turned on (FIG. 4B), the band or belt couples tightly to the wheels due to the electrostatic effect. Now tension is transmitted from wheel 410 to 420 and wheel 420 starts to also rotate. The advantages of the electrolaminate clutch described earlier such as being lightweight, being able to achieve rapid engagement and disengagement, and being inexpensive apply to band clutches as well.

In some concepts, the wheels do not need to be of the same diameter. In some other concepts, there may be more than one unactuated wheel. In yet other concepts, the band or belt need not be straight as shown—they may be twisted. In other concepts, the band can be at high potential and the wheels can be at the lower potential (or vice versa).

VI. Electrolaminate Wrap Spring Clutch

Figure 5A:
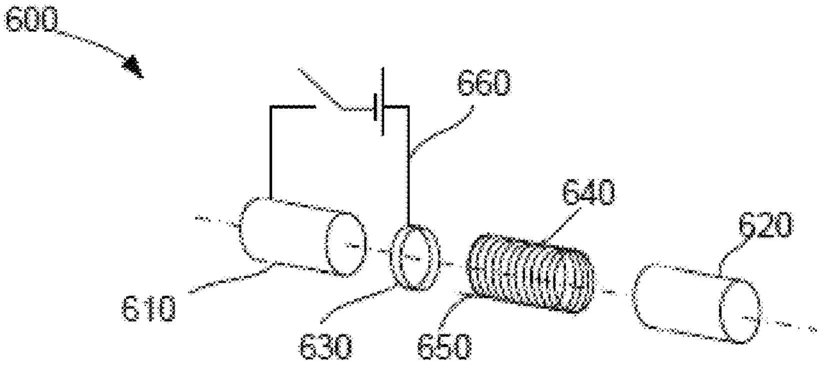
FIGS. 5A and 5B illustrate a wrap spring clutch.
Figure 5B:
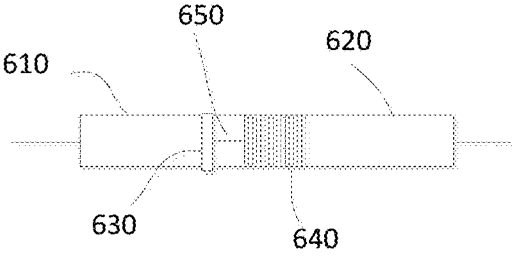

FIGS. 5A-B illustrate yet another concept of a clutch utilizing the electrolaminate effect. Referring now to FIG. 5A, two shafts 610 and 620 are shown. Shaft 610 is an input shaft such that it may be actuated by a motor or other device or it may itself be part of an actuator. Shaft 620 is the output shaft which may be further connected to other components such as but not limited to gears, pulleys and loads. Spring 640 couples shaft 610 and output shaft 620 such that in an assembled configuration, the device 600 may appear as illustrated in FIG. 5B. Shaft 610 and 620 may be in close contact with each other within the spring 640. The inside diameter of spring 640 may be slightly larger (e.g. 0.2 mm) than outside diameter of the shaft 610 but may be slightly smaller (e.g. 0.2 mm) than the outside diameter of output shaft 620. Spring 640 may have an extension 650 which may be mechanically placed under a ring 630 as shown in FIG. 5B. An electrical circuit 660 may be connected to the ring 630 and input shaft 610 as shown in FIG. 5A via slip rings and brushes (not shown in the figure). The ring 630 may form one side of an electrolaminate device with the other side being the input shaft 610.

In operation, when the electrical circuit 660 is open, the input shaft 610 may freely rotate within the spring 640. The input torque is not coupled to the output shaft 620. When electrical circuit is closed, the ring 630 couples tightly to input shaft 610 which causes the spring to clamp down on the input shaft, thus causing the spring to rotate in the direction of the input shaft. The torque is transmitted through the spring to the output shaft 620 which now begins to rotate. The maximum magnitude of the torque applied to the output shaft through the spring is determined by the Capstan equation which includes the effect of having a variable number of turns. This equation is given below as Eqn. 6:

$$T_{load}=T_{hold}e^{\mu\theta} \qquad \text{Eqn. 6}$$

where $T_{hold}$ is the applied tension generated by the clamped electrolaminate ring, $T_{load}$ is the resulting force exerted at the other side of the capstan and θ is the total angle swept by all the turns of the spring. The combination of the spring with the electrolaminate ring allows the maximum torque of the clutch to exceed the maximum torque that the electrolaminate ring would be able to withstand alone.

In other variations of the concept, more than one spring may be utilized. The additional springs may be wrapped in opposing directions such that torque may be transmitted in clockwise or counter-clockwise directions.

VII. Detailed Description of a Device Using Wrap Spring Clutch

Figure 6A:
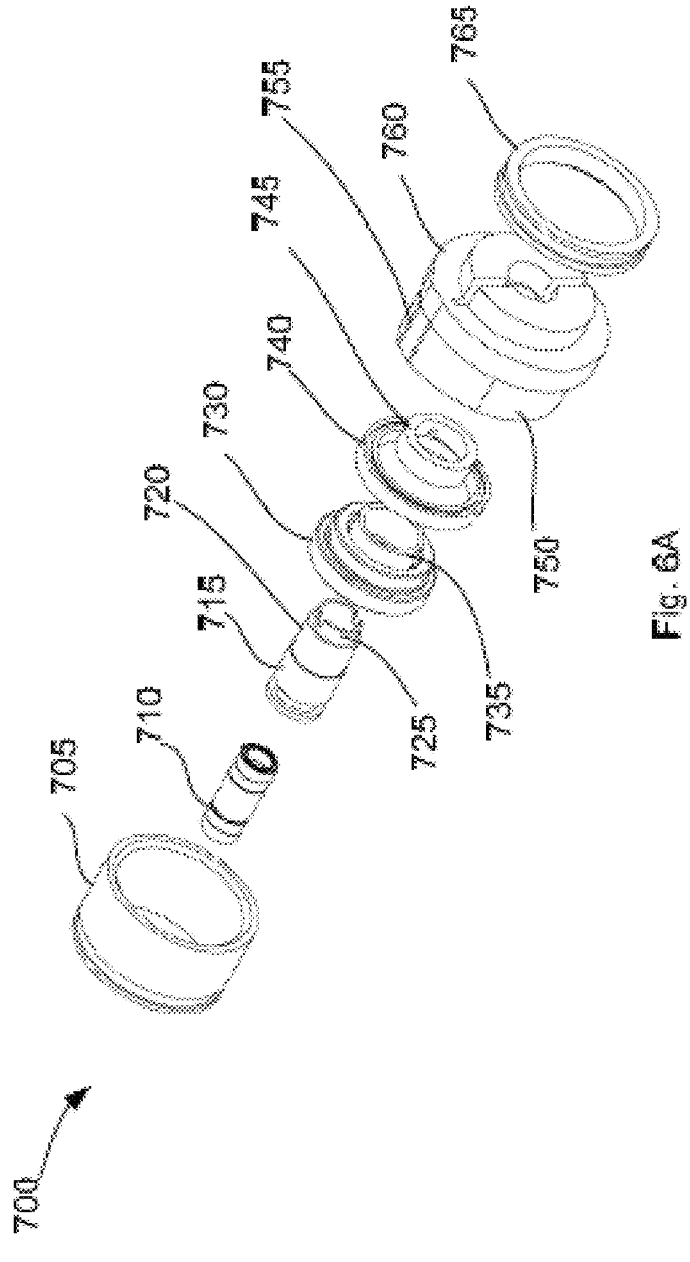
FIG. 6A illustrates an exploded view of device using a wrap spring clutch.
Figure 6B:
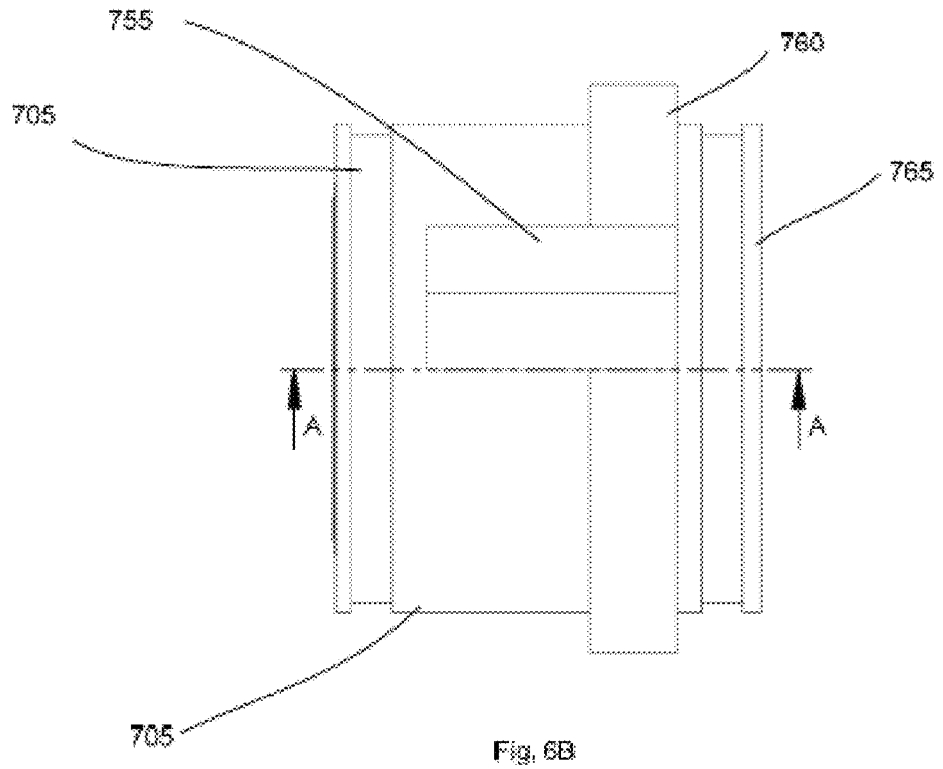
FIG. 6B shows a top view of the device shown in FIG. 6A when assembled.
Figure 6C:
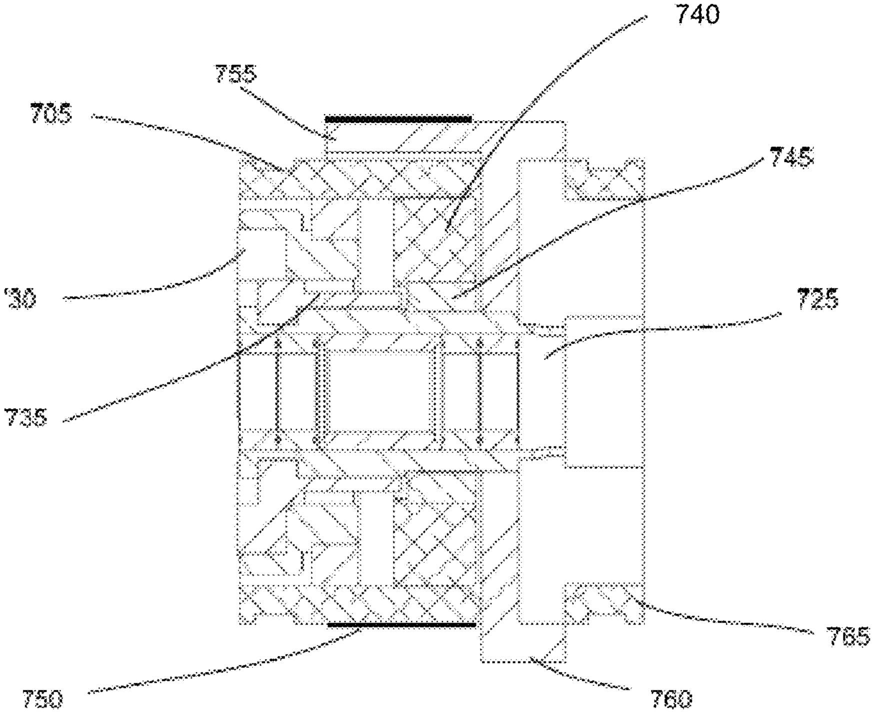
FIG. 6C shows a cross sectional view along section AA shown in FIG. 6B.
Figure 6D:
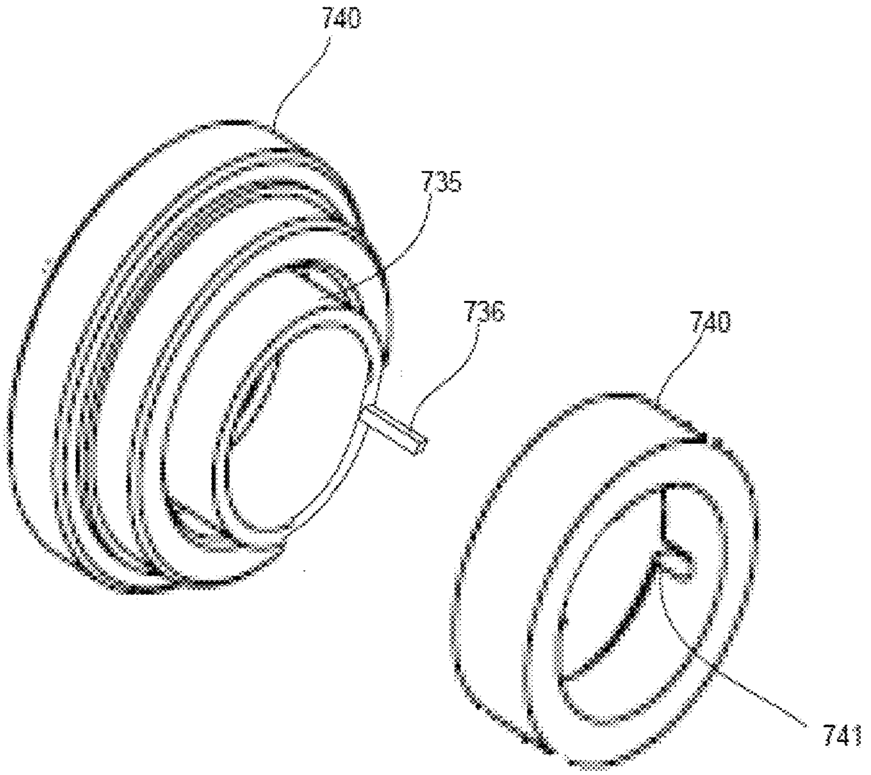
FIG. 6D shows details of a spring and a spring capture ring of the device shown in FIG. 6A.

FIGS. 6A-C illustrate the details of a clutch using a wrap spring mechanism. FIG. 6A is an exploded view. FIG. 6B is the top view and FIG. 6C is the cross sectional view along section AA. The input of the device is shown as member 725. This member may be coupled via slots to an external source such as a motor. The motor is not shown in the figure. Members 725, 720 and 715 may thus rotate continuously when the external motor is coupled and rotating. The function of member 715 and 720 will be explained below. Input member 725 may also be coupled to the electrolaminate mount 760 such that it too rotates when an external input is applied. The function of the electrolaminate mount is to keep the electrolaminate sheet 750 in place by means of a coupling nut or screw 755 which couples the electrolaminate mount to the electrolaminate. The coupling nut or screw 755 is seen clearly in FIGS. 6B and 6C. The electrolaminate is shown as a thin dark rectangle in FIG. 6C but is not included in FIG. 6B so that the coupling screw or nut may be seen clearly. Member 765 is the power electrical power drum which supplies power to the electrolaminate via brushes which are not included in the figure for clarity. On the output side, member 730 forms the output. Member 730 is seen clearly in FIGS. 6A and 6C. Member 730 may be coupled rigidly to a wrap spring 735. The spring is shown separately in FIG. 6D to show clearly that it has a tab or a tail at its end. The tail of the spring is shown as member 736. When assembled, the tail of the spring may fit in a groove 741 in a spring capture ring 740 such that when the spring capture ring rotates, the spring will rotate. Referring back to FIG. 6A, when assembled, the wrap spring may be positioned over the surface 715 which forms part of the input side as specified earlier. Also when assembled, the spring capture ring 740 may be positioned over surface 720 but may slide over this surface. When the spring capture ring rotates, the wrap spring may clamp down on the surface 715. If the input is rotating, then the clamping action will cause the spring to rotate which will cause the output 740 to rotate.

The spring capture ring may be rigidly coupled to the electrical ground drum 705. When assembled, the electrical ground drum may be positioned under the electrolaminate 750. The position of the electrical ground drum may be clearly seen in FIG. 6C. The electrical ground drum may be connected to electrical ground by brushes (not shown in the figures). The electrical ground drum forms the companion surface to the electrolaminate sheet 750 such that the sheet may clamp on to the surface of the electrical ground drum due to the electrostatic force between the laminate and the drum. Any motion of the electrolaminate may thus be imparted to the drum. As described earlier, the electrolaminate drum may also rotate with the input. Thus, if the input rotates and if a voltage is applied to the electrolaminate sheet, the electrical ground drum may also rotate. When the drum rotates, the spring capture ring 745 rotates, which will cause the output 730 to rotate as explained earlier. Thus by controlling when voltage is applied to the electrolaminate, the input rotation may be coupled to the output.

VIII. Two-Speed Transmission System Using The Electrolaminate Wrap Spring Clutch FIGS. 7A-G illustrate a two speed transmission system using the wrap spring clutch. This type of implementation may be used for example within a shoulder joint of a humanoid robot, where the motor within the implementation can pull or be powerful in only one direction but can rotate clockwise or counterclockwise. In such a system, the motor may always pull on components it is coupled to such as but not limited to cables and tendons.

Figure 7A:
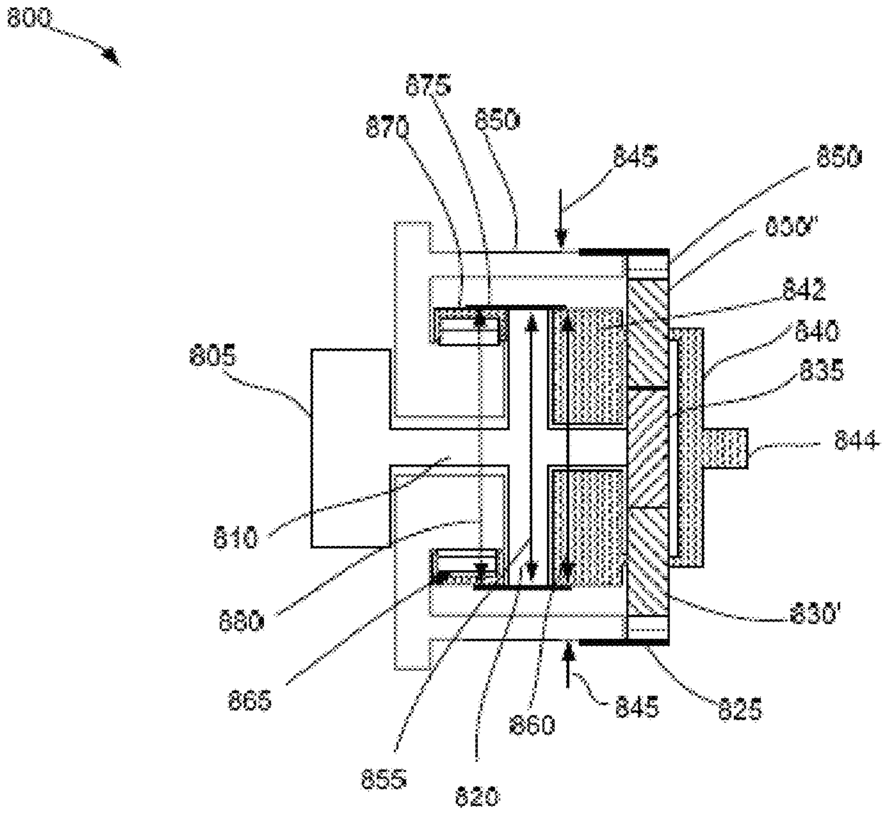
FIG. 7A illustrates a two speed gear box using wrap springs with electrolaminate tails.
Figure 7C:
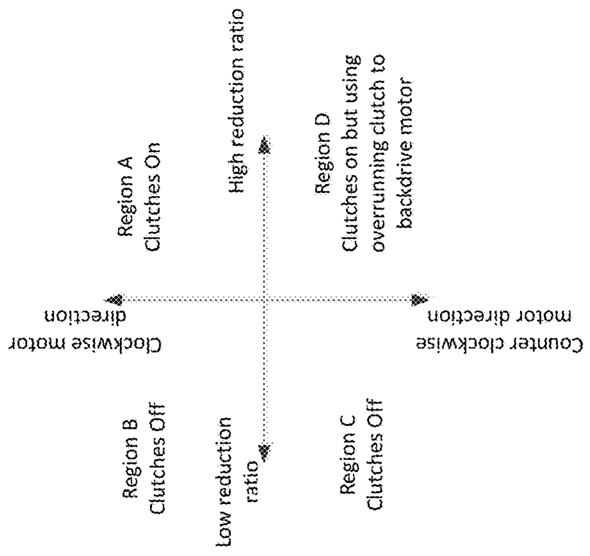
FIGS. 7B, 7C, 7D, 7E, 7F, and 7G illustrate in detail various operating modes of the device depicted in FIG. 6A.
Figure 7B:
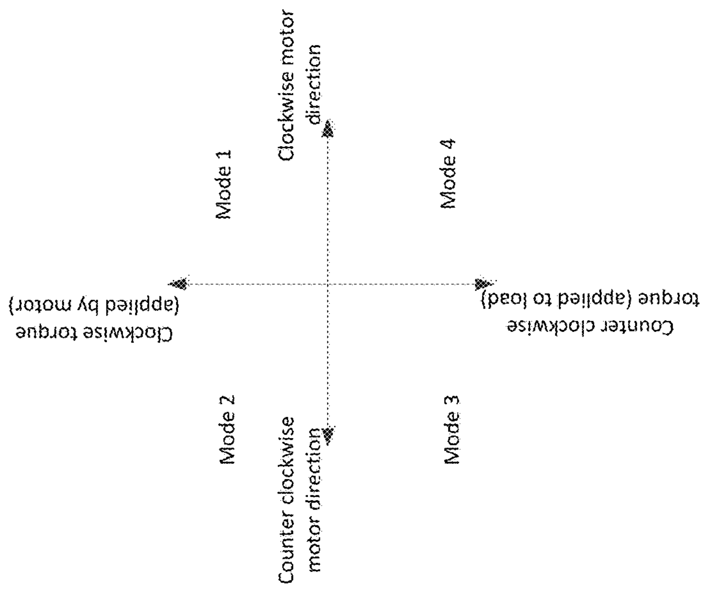

FIG. 7A illustrates a cross section of the motor. FIG. 7B describes the various modes of operation of the motor. FIG. 7C illustrates that the motor can achieve low or high gear reduction ratios. And FIGS. 7D-G illustrate in more detail how various modes may work.

Referring to FIG. 7A, a motor is shown as 805 with a shaft 810, a drum 820 coupled to the shaft, a sun gear 835. The sun gear 835 is coupled to a planetary system with planet gears 830' and 830". A third planetary gear 830'" is not shown. The planet gears rotate within a ring gear 850. A planet carrier 840 is shown such that it couples to the planet gears 830', 830" and 830'" (830'" is not shown). The planet carrier carries the motor output 844. The planet carrier is also coupled to a planet carrier drum 842; this drum is the same size as the drum 820 and it also rotates about the shaft 810. The housing of the ring gear 850 is coupled via a wrap spring 825 to the motor housing 850. As in device 600, the wrap spring 825 may have an extension which may be placed under a ring which may be located over the motor housing, in close proximity to the spring. The ring may form one side of the electrolaminate device whereas the motor housing may form the other side. The ring may be connected to an electrical circuit via brushes or slip rings. The motor housing is stationary and it can be connected easily to the other side of an electrical circuit. When a voltage is applied across the ring and housing, the ring can clamp down on the housing causing the spring extension (located under the ring) to also be stationary. The spring 825 is always coupled tightly to the housing of the ring gear 850; however the internal diameter of the spring 825 is such that it is slightly larger (e.g. 0.1 mm to 0.5 mm) than the external diameter of the motor housing. The external diameter of the motor housing is indicated by arrows 845 in the figure. Upon application of a high voltage, the extension of the of the wrap spring 825 under the ring may couple tightly with the motor housing. As the motor housing is fixed to ground, it cannot rotate. Thus when the high voltage is applied to the ring, the ring gear is also not able to rotate.

A second wrap spring 875 with an electrolaminate activated ring is also included and couples the planet carrier drum 842, the drum 820 and another housing 870—a housing of a one-way roller clutch—in the following way. The internal diameter of the spring wrap 875 is such that it passively couples the planet carrier drum 842 and the drum 820. In other words, the internal diameter of the wrap spring is smaller than the outside diameter of the planet carrier drum 842 indicated by arrow 860 and also is smaller than the outside diameter of the drum 820 indicated by the arrow 855. This arrangement of diameters is such that the planet carrier drum 842 and drum 820 are passively engaged to each other. The ring of the spring 875 is placed over the housing of the one-way roller clutch 865 and may be activated using the electrolaminate effect.

If wrap spring 875 is not activated, since the drum 820 and the planet carrier drum 842 are passively engaged, if the motor turns in the direction of the wrap spring, for example if the spring wind direction is clockwise and the motor spins clockwise, then the output 844 follows the motor without any gear reduction. The clockwise spring wind direction is used as an example—the spring may be wound in the counterclockwise direction and the opposite situation as described above may occur with regards the motor direction and output. Continuing with the example of the spring wind direction in the clockwise direction and assuming still that the wrap spring 875 is not activated, if the motor spins in the counter-clockwise direction, this rotation will not be coupled to the output. However if the output spins in the counter-clockwise direction, the output is able to back-drive the motor. The description of the operation of the device 800 when wrap spring 875 is activated will be described later, after describing the operation of the device when wrap spring 825 is activated.

Spring 825, as described earlier, is always coupled to the ring gear 850, but its ring has to be activated for it to couple to the motor housing 850. Spring 825 needs to be activated if a gear reduction is required. In the situation where the spring 825 is not activated, the ring gear 850 will rotate with the planetary system and the output is described above. In the situation where the spring 825 is activated, the ring gear cannot move as the spring clamps down on the motor housing, locking the ring gear to the motor housing. To ensure that the planet carrier rotates such that a gear reduction is obtained at the output, the planet carrier drum 842 has to be decoupled from the drum 820. This is achieved by activating the spring 875, which as described earlier, has an electrolaminate ring over the housing of the one-way roller 865. If this ring is activated, the ring is held in place and the planet carrier drum 842 decouples from the drum 820 and does not rotate with drum 820. The rotation of the planetary gears 830', 830" and 830'" (830'" is not shown) is caused by the rotation of the sun gear 835. In this situation, when the outer ring gear 850 is stationary, the output 844 experiences a gear reduction as given by Eqn. 7:

$$r = \frac{1}{1 + \frac{N_r}{N_s}} \quad \text{Eqn. 7}$$

where $N_r$ is the number of ring gear teeth and $N_s$ is the number of sun gear teeth.

In the situation where wrap spring 825 is activated, and the output is required to back-drive the motor (i.e. cause the motor to spin in the counter clockwise direction as an example), the ring of the spring 875 needs to be allowed to spin in the direction of the back-drive (counter-clockwise for example). Hence, a one-way roller 880 is included such that in this specific situation where the output is back-driving the motor, the ring of the spring 825 is clamped to the housing of the one-way roller (thus decoupling the planet carrier drum 842 from the drum 820), however the one way roller is able to roll counter clockwise over the motor housing 850. The shaft 835 may spin counter clock-wise faster than the planets (also spinning counter clockwise) due to the gear reduction ratio but that does not cause any issues as far as achieving back drive is concerned.

FIG. 7C describes the various situations described above. The figure illustrates that in region A and D, a gear reduction ratio is obtained by turning on both clutches or activating the springs. In region A, the motor is driving the output but in region D, the load back drives the motor but using an overrunning clutch as explained above. In regions B and C, the clutches are off and the device operates at no gear reduction. In region B, the motor drives the load and in region C, the load back-drives the motor.

FIGS. 7B, 7D, 7E, 7F, and 7G describe the various modes the device can interact with the load, regardless of the gear reduction ratio.

Mode 1: Motor applied torque direction is clockwise, motor direction is clockwise.

Figure 7D:
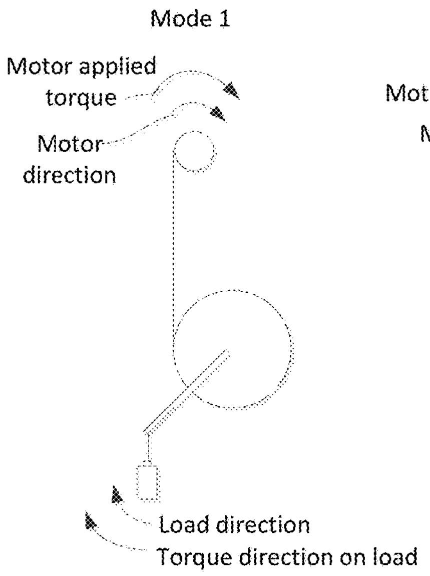

Referring to FIG. 7D, in this mode, the load is being lifted (in this example in the counter clockwise direction) and torque is being applied to the load by the motor also in the counter clockwise direction. The motor rotates in the counter clockwise direction as well. For no gear reduction, the spring clutches are not engaged. For gear reduction, the clutches are engaged. This mode is indicated as "Mode 1" in FIG. 7B. When the clutches are on, the device 800 is in Region A in FIG. 7C. When the clutches are off, the device 800 is in region B.

Mode 2: Motor applied torque direction is clockwise, motor direction is counter-clockwise (Controlled fall).

Figure 7E:
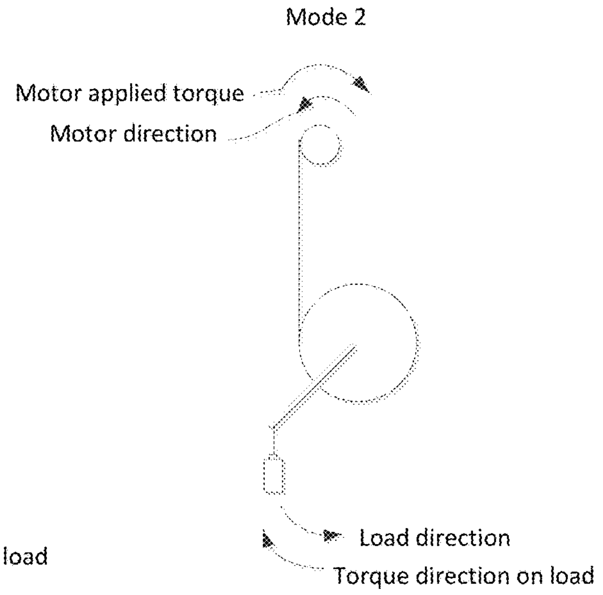

Referring to FIG. 7E, the load is lowered but at a controlled rate. The motor is still applying torque in a clockwise direction to achieve the controlled fall however the motor is allowed to turn counter clockwise to allow to load to be lowered. When the clutches are off, the device 800 is in Region C in FIG. 7C. When the clutches are on, the device 800 is in region D.

Mode 3: Direction of torque from the load is counter-clockwise, motor direction counter-clockwise.

Figure 7F:
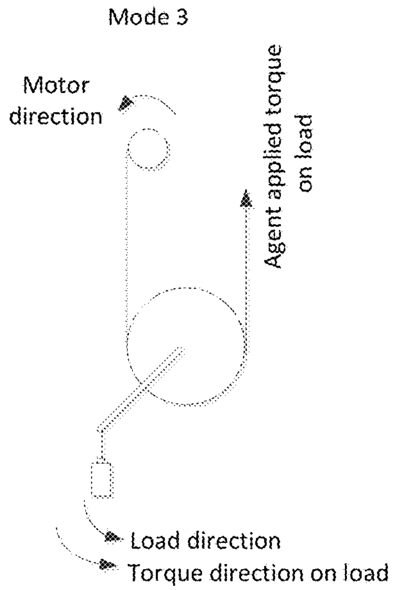
Figure 7G:
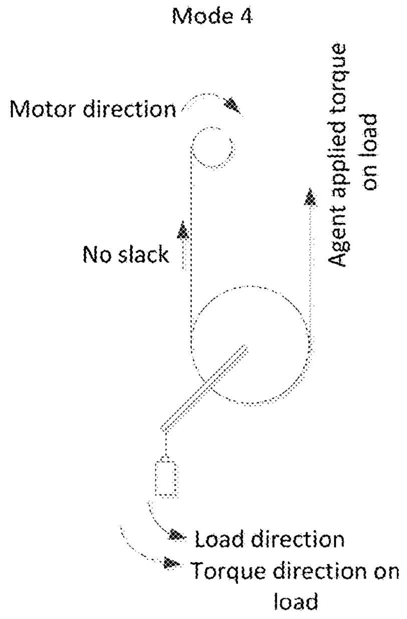

Referring to FIG. 7F, the motor is not applying any torque. It is simply allowing the load to back drive. Another agent such as another motor or another actuator may be pulling on the load as indicated. When the clutches are off, the device 800 is in Region C in FIG. 7C. When the clutches are on, the device 800 is in region D.

Mode 4: Direction of torque from the load is counter-clockwise, motor direction clockwise (No slack condition).

Referring to FIG. 7Q as in mode 3, another agent such as another motor or another actuator may be pulling on the load as indicated. The motor is illustrated as turning in the clockwise direction to obtain such states as a no-slack condition. It may be resisting the torque applied by the external agent as well. Both the motor and the load may be rotating in a clockwise direction, but the load is decelerating the system. When the clutches are on, the device 800 is in Region A in FIG. 7C. When the clutches are off, the device 800 is in region B.

Hence it is now explained how the four different modes of FIG. 7B may be achieved along with the operations in the four different regions of FIG. 7C.

With the forgoing discussion, it can now be seen how electrolaminates may be utilized to make clutches which have many advantageous properties.

IX. Summary Concepts

Example concepts related to this disclosure include:

A first concept of a method of coupling an input stage to an output stage by utilizing two surfaces, at least one of which is flexible and thin (less than 0.5 mm), which may be electrostatically clamped together when a voltage is applied across the two surfaces. When clamped, the input rotation is imparted to the output stage which also begins to rotate. When the voltage is turned off, no rotation is imparted to the output stage.

The method of the first concept, where a first surface is coupled to electrical ground and where a second surface is coupled to an electrical power source via a brush or a slip ring and where the second surface is also coupled to a spider spring. When no voltage is applied, the two surfaces are separated but when a voltage is applied, the two surfaces electrostatically clamp together and rotation is transmitted from an input stage to an output stage.

The method of the first concept, where a first surface is coupled to electrical ground and where a second surface is coupled to an electrical power source via a brush or a slip ring and where the second surface is supported by a pin structure with or without an axial spring. When no voltage is applied, the two surfaces can rotate relative to each other but when a voltage is applied, the two surfaces electrostatically clamp together and rotation is transmitted from an input stage to an output stage.

A second concept of a two speed transmission system using a first and second electrolaminate disc clutch and where the first disc clutch is associated with one or more gear stages and where the second clutch is associated with an output stage.

The two speed transmission system of the second concept, where the output of the device can be switched between a high speed low torque operation and a low speed high torque operation.

A third concept of a method of coupling an input stage to an output stage by utilizing two discs and a band which traverses over the side surfaces of the two discs and where the band may be electrostatically clamped to the discs when a voltage is applied across the band and the two discs. When clamped, the input rotation is imparted to the output stage which also begins to rotate. When the voltage is turned off, no rotation is imparted to the output stage.

A fourth concept of a device that couples an input stage to an output stage by utilizing a first (input) and a second (output) shafts and where a spring loosely couples to first or input shaft and tightly couples to the second or output shaft; and where the spring has a tail coupled to an electrolaminate surface such that when a voltage is applied to the electrolaminate surface, it clamps to input shaft and imparts the rotation of the input to the output.

A fifth concept of a device which includes: (a) An input shaft coupled to an electrolaminate sheet; (b) An output shaft coupled rigidly to a spring positioned over the input shaft, the spring having a tab that fits in a groove within a spring capture ring; (c) A spring capture ring also positioned over the input shaft; and (d) A drum connected to electrical ground positioned between the electrolaminate sheet and a spring capture ring; the drum being coupled rigidly to the spring capture ring; all in such a manner that when a voltage is applied to the electrolaminate sheet, it clamps to the drum and imparts the rotation of the input to the drum, which then causes the spring capture ring to rotate, which then subsequently causes the spring to rotate and clamp down on the input shaft, thus imparting rotation to the final output of the device.

A sixth concept of a method of utilizing two wrap-spring devices as described as either the fourth concept or the fifth concept above on a common shaft in order to transmit torque bi-directionally from an input to an output.

X. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A method, comprising:

coupling an input stage to an output stage by utilizing an electrolaminate clutch comprising a first portion and a second portion, wherein at least one portion of the electrolaminate clutch is flexible and comprises a substrate, a conductive layer disposed on the substrate, and a dielectric layer disposed on the conductive layer with the dielectric layer facing the other portion of the electrolaminate clutch, wherein the two portions are electrostatically clamped together when a voltage is applied between the two portions, wherein when the two portions are clamped, an input rotation is imparted to rotate the output stage, and when the voltage is not applied, the input rotation is not imparted to the output stage.

2. The method of claim 1, wherein the first portion is coupled to electrical ground, wherein the second portion is coupled to an electrical power source via a brush or a slip ring and is supported by a pin structure.

3. The method of claim 1, wherein each of the first and second portions of the electrolaminate clutch is flexible and comprises a respective substrate, a respective conductive layer, and a respective dielectric layer, with the respective dielectric layers of the two portions facing each other.

4. The method of claim 1, wherein the at least one portion of the electrolaminate clutch has a thickness of 0.09 inches or less.

5. A device, comprising:

an input shaft coupled to an electrolaminate sheet;

a spring positioned over the input shaft;

a spring capture ring coupled to the spring;

an output shaft coupled rigidly to the spring; and a drum positioned between the electrolaminate sheet and the spring capture ring, wherein the drum is coupled rigidly to the spring capture ring, wherein when a voltage is applied to the electrolaminate sheet, the electrolaminate sheet clamps to the drum and imparts rotation of the input shaft to the drum causing the spring capture ring to rotate, which subsequently causes the spring to rotate and clamp down on the input shaft to impart rotation to the output shaft.

6. The device of claim 5, wherein the spring has a portion that fits in a groove in the spring capture ring.

7. The device of claim 5, wherein the drum is connected to an electrical ground.

8. The device of claim 5, wherein the spring is a wrap spring.

9. A device, comprising:

an electrolaminate clutch comprising a first portion and a second portion, wherein at least one portion of the electrolaminate clutch is flexible and comprises a substrate, a conductive layer disposed on the substrate, and a dielectric layer disposed on the conductive layer with the dielectric layer facing the other portion of the electrolaminate clutch;

an input stage coupled to the first portion of the electrolaminate clutch;

an output stage coupled to the second portion of the electrolaminate clutch; and an electrical circuit electrically connected to the first and second portions of the electrolaminate clutch, wherein (i) when the electrical circuit applies a voltage between the two portions, the two portions are electrostatically clamped together such that an input rotation is imparted to rotate the output stage and (ii) when the electrical circuit does not apply the voltage, the input rotation is not imparted to the output stage.

10. The device of claim 9, wherein each of the first and second portions of the electrolaminate clutch is flexible and comprises a respective substrate, a respective conductive layer, and a respective dielectric layer, with the respective dielectric layers of the two portions facing each other.

11. The device of claim 9, wherein the at least one portion of the electrolaminate clutch is the first portion, and wherein the second portion of the electrolaminate clutch is rigid and comprises a metal surface.

12. The device of claim 9, wherein the at least one portion of the electrolaminate clutch is the second portion, and wherein the first portion of the electrolaminate clutch is rigid and comprises a metal surface.

13. The device of claim 9, wherein the at least one portion of the electrolaminate clutch has a thickness of 0.09 inches or less.

14. The device of claim 9, wherein the first portion of the electrolaminate clutch comprises a first disk and the second portion of the electrolaminate clutch comprises a second disk.

15. The device of claim 14, wherein the first disk is coupled to a spring, wherein the spring allows the first disk to move toward the second disk when the voltage is applied, and wherein the spring causes the first disk to move away from the second disk when the voltage is not applied.

16. The device of claim 15, wherein the electrical circuit is electrically connected to the first disk through the spring.

17. The device of claim 9, wherein the output stage comprises a gearbox.

18. The device of claim 9, wherein the first portion of the electrolaminate clutch comprises a first drum and the second portion of the electrolaminate clutch comprises a second drum.

* * * * *